United States Patent
Kawasaki (10) Patent No.: US 8,260,194 B2
(45) Date of Patent: Sep. 4, 2012

(54) INFORMATION COMMUNICATION METHOD, INFORMATION COMMUNICATION SYSTEM, INFORMATION RECEPTION APPARATUS, AND INFORMATION TRANSMISSION APPARATUS

(75) Inventor: Kenichi Kawasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1101 days.

(21) Appl. No.: 12/215,817

(22) Filed: Jun. 30, 2008

(65) Prior Publication Data

US 2009/0029648 A1    Jan. 29, 2009

(30) Foreign Application Priority Data

Jul. 25, 2007 (JP) ................. P2007-193623

(51) Int. Cl.
*H04H 40/00* (2008.01)
(52) U.S. Cl. ....... 455/3.06; 455/39; 455/414.1; 381/388
(58) Field of Classification Search .................. 455/3.06, 455/39, 414.1, 414.4, 23, 42, 60, 67.16, 139, 455/205, 276.1; 381/388, 77, 386; 379/420.01; 342/175, 375.06
See application file for complete search history.

(56) References Cited

U.S. PATENT DOCUMENTS

| | | | |
|---|---|---|---|
| 4,395,597 A * | 7/1983 | Suzuki et al. ................. 181/170 |
| 5,086,775 A * | 2/1992 | Parker et al. .................. 600/453 |
| 5,099,848 A * | 3/1992 | Parker et al. .................. 600/443 |
| 5,705,975 A * | 1/1998 | Serino et al. ............. 340/426.34 |
| 6,425,456 B1 * | 7/2002 | George .......................... 181/199 |
| 6,445,338 B1 * | 9/2002 | Ohkubo ......................... 342/104 |
| 6,661,473 B1 * | 12/2003 | Teshima et al. ............... 348/787 |
| 6,904,157 B2 * | 6/2005 | Shima ............................ 381/388 |
| 7,162,048 B2 * | 1/2007 | Shima ............................ 381/334 |
| 7,336,226 B2 * | 2/2008 | Jung et al. ................. 342/357.52 |
| 7,386,109 B2 * | 6/2008 | Suzuki et al. ............. 379/202.01 |
| 7,519,175 B2 * | 4/2009 | Suzuki et al. ............. 379/420.01 |
| 7,546,897 B2 * | 6/2009 | Takebe et al. .................. 181/167 |
| 7,555,321 B2 * | 6/2009 | Yamada et al. ............. 455/575.1 |
| 7,617,342 B2 * | 11/2009 | Rofougaran ................... 710/100 |
| 7,908,420 B2 * | 3/2011 | Rofougaran ................... 710/306 |
| 8,010,735 B2 * | 8/2011 | Rofougaran ................... 711/103 |
| 2002/0018576 A1 * | 2/2002 | Shima ............................ 381/396 |
| 2004/0061075 A1 * | 4/2004 | Pruszenski, Jr. ........... 250/492.1 |
| 2005/0031351 A1 * | 2/2005 | Nishimura et al. ........... 398/135 |
| 2005/0093970 A1 * | 5/2005 | Abe et al. ..................... 348/14.05 |
| 2005/0254640 A1 * | 11/2005 | Ohki et al. .................. 379/406.1 |
| 2006/0280321 A1 * | 12/2006 | Miura et al. ................... 381/186 |
| 2007/0032258 A1 * | 2/2007 | Yamada et al. ............. 455/550.1 |
| 2007/0064925 A1 * | 3/2007 | Suzuki et al. ............. 379/420.01 |
| 2007/0172076 A1 * | 7/2007 | Mori et al. ........................ 381/77 |
| 2007/0268178 A1 * | 11/2007 | Jung et al. ................. 342/357.06 |

(Continued)

FOREIGN PATENT DOCUMENTS

JP        01-231500        9/1989

(Continued)

*Primary Examiner* — Minh D Dao
(74) *Attorney, Agent, or Firm* — Robert J. Depke; Rockey, Depke & Lyons, LLC (57) ABSTRACT

An information communication method includes transmitting a millimeter-band radio wave from a reception side, reflecting the transmitted radio wave at a transmission side while vibrating the transmitted radio wave corresponding to first information transmitted by the transmission side, and receiving the reflected radio wave at the reception side and reconstructing the first information based on a phase difference between the transmitted radio wave and the received radio wave.

16 Claims, 6 Drawing Sheets

U.S. PATENT DOCUMENTS

| | | |
|---|---|---|
| 2009/0006677 A1* | 1/2009 | Rofougaran ............ 710/63 |
| 2009/0154740 A1* | 6/2009 | Regen et al. ............ 381/311 |
| 2010/0035370 A1* | 2/2010 | Ding et al. ............ 438/29 |
| 2010/0117891 A1* | 5/2010 | Utagawa et al. ............ 342/175 |

FOREIGN PATENT DOCUMENTS

| | | |
|---|---|---|
| JP | 04-040325 | 2/1992 |
| JP | 09-230059 | 9/1997 |
| JP | 11-262084 | 9/1999 |
| JP | 2000-258529 | 9/2000 |
| JP | 2001-016695 | 1/2001 |
| JP | 2001-174550 | 6/2001 |
| JP | 2001-298797 | 10/2001 |
| JP | 2002-125299 | 4/2002 |
| JP | 2003-050277 | 2/2003 |

* cited by examiner

INFORMATION COMMUNICATION METHOD, INFORMATION COMMUNICATION SYSTEM, INFORMATION RECEPTION APPARATUS, AND INFORMATION TRANSMISSION APPARATUS

CROSS REFERENCES TO RELATED APPLICATIONS

The present invention contains subject matter related to Japanese Patent Application JP 2007-193623 filed in the Japanese Patent Office on Jul. 25, 2007, the entire contents of which being incorporated herein by reference.

BACKGROUND OF THE INVENTION

1. Field of the Invention

The present invention relates to an information communication method, an information communication system, an information reception apparatus, and an information transmission apparatus, which use a millimeter-band radio wave (30 GHz to 300 GHz).

2. Description of the Related Art

In general, information communication using an electromagnetic wave employs an electromagnetic wave of SHF (Super High Frequency; 3 GHz to 30 GHz) or lower. For example, a signal is electrically modulated to have SHF or lower by a modulation circuit of a transmission apparatus, and then the modulated signal is transmitted to a reception apparatus via a transmission antenna. Subsequently, the signal is received by the reception apparatus using a reception antenna, and then the received signal is demodulated by a demodulation circuit.

For example, Japanese Patent Application Laid-open 2003-050277 (paragraph 0002; hereinafter referred to as Patent Document 1) describes that a radio wave having a frequency of millimeter band or higher "has an excellent transmittance different from light, and is used to obtain an image of an object shielded with a mist, a cloth, paper, or the like".

SUMMARY OF THE INVENTION

However, Patent Document 1 also describes "there are many difficulties from a technical point of view to obtain a millimeter-wave image. Specifically, a high-frequency circuit technology is a major obstacle for realization in these days". Therefore, in a case where the above-mentioned general communication method used in the frequency of SHF or lower is applied to the millimeter band, it is considered that the characteristics of the millimeter-band radio wave may show smaller merits while larger demerits may be seen from a technical point of view.

In view of the above, the present invention addresses an information communication method, an information communication system, an information reception apparatus, and an information transmission apparatus, which eliminate the technical demerits of the millimeter band as much as possible, and employ a totally novel communication system utilizing the characteristics of the millimeter band.

With enhanced performance of devices in these days, there is a strong possibility that millimeter-band communication is realized and generally used. A wavelength of a millimeter wave is as small as 1 mm to 10 mm in the air. Therefore, by controlling directionality of the radio wave to a desired direction and by structuring a doppler radar, it is possible to detect minute vibration of a transmission side. For example, there is a report that vibration of about 10 μm can be detected with a signal of about 27 GHz. With the above-mentioned structure, the larger frequency would increase the detection sensitivity. In view of the above, the present invention addresses a totally novel information communication method utilizing the characteristics of the millimeter band.

According to an embodiment of the present invention, an information communication method includes transmitting a millimeter-band radio wave from a reception side, reflecting the transmitted radio wave at a transmission side while vibrating the transmitted radio wave corresponding to first information transmitted by the transmission side, and receiving the reflected radio wave at the reception side and reconstructing the first information based on a phase difference between the transmitted radio wave and the received radio wave. That is, a doppler radar function is employed.

According to this embodiment, since the doppler radar function is employed, it is not necessary for the transmission side to include a circuit dedicated to the millimeter wave other than a unit for reflecting and vibrating the millimeter-band radio wave. Information can be transmitted/received while utilizing the following characteristics of the millimeter-band radio wave. That is, the millimeter wave capable of passing through a soundproof wall and the like enables information communication therethrough, and the millimeter wave having a small wavelength enables communication excellent in directionality.

In this embodiment, preferably, the transmission side vibrates a reflection mechanism for reflecting a millimeter-band radio wave using a speaker provided with the reflection mechanism, corresponding to the first information, to reflect the transmitted radio wave while vibrating the transmitted radio wave corresponding to the first information.

Therefore, specifically in a case where the method of this embodiment is applied to a general device including a speaker, an information communication unit dedicated to the millimeter band can be added to the general device without newly securing a space. In addition, the reflection mechanism can be provided to the vicinity of a front surface of the speaker. So the reflection mechanism is not restricted by the structure of the speaker.

In this embodiment, the first information transmitted by the transmission side may at least include audible information, the audible information enabling to reproduce audible sound output by the speaker.

Therefore, general sound information can be transmitted from the speaker to the reception side.

In this embodiment, preferably, the transmission side outputs a signal mapped into a predetermined vibration frequency corresponding to the first information, to the speaker, and mechanically vibrates the speaker at the predetermined vibration frequency.

To "map into a predetermined vibration frequency corresponding to the first information" means that, in a case of transmitting information of "0", the vibration frequency is variable from f 0 Hz to f 1 Hz. In a case of transmitting information of "1", the vibration frequency is variable from f 1 Hz to f 0 Hz. Based on the definition, the information is transmitted.

In this embodiment, the information communication method may further include modulating second information into a millimeter-band radio wave and transmitting the radio wave from one of the transmission side and the reception side, and receiving the transmitted radio wave and demodulating the transmitted radio wave into the second information at another one of the transmission side and the reception side.

Therefore, a high-speed millimeter-wave bidirectional communication can be simultaneously performed. For example, as to the first information, information transmission velocity therefor is low while a high degree of privacy is offered. So the first information may be key information. Further, the second information may be substantial information which turns into readable owing to the key information.

In this embodiment, the reception side may receive the radio wave for the first information using a first antenna, and the reception side may transmit/receive the radio wave for the second information using the first antenna. Alternatively, the reception side may receive the radio wave for the first information using a first antenna, and the reception side may transmit/receive the radio wave for the second information using a second antenna, the second antenna being different from the first antenna.

According to another embodiment of the present invention, an information communication method is provided. In the information communication method, the radio wave is emitted to a reflection mechanism for reflecting a millimeter-band radio wave. The reflection mechanism is vibrated using a speaker provided with the reflection mechanism and provided to a transmission side, corresponding to first information transmitted by the transmission side, to reflect the radio wave. The radio wave reflected by the reflection mechanism is received at a reception side. The first information is demodulated.

According to this embodiment, the reflection mechanism on the speaker is used as a reflector. Information can be transmitted/received with an extremely simple configuration while utilizing the following characteristics of the millimeter-band radio wave. That is, the millimeter wave capable of passing through a soundproof wall and the like enables information communication therethrough, and the millimeter wave having a small wavelength enables communication excellent in directionality.

According to another embodiment of the present invention, an information communication system includes an information reception apparatus and an information transmission apparatus. The information reception apparatus includes a transmission/reception unit, a detection unit, and a reconstruction unit. The transmission/reception unit is configured to transmit/receive a millimeter-band radio wave. The detection unit is configured to detect a phase difference between the radio waves transmitted/received by the transmission/reception unit. The reconstruction unit is configured to reconstruct information based on the phase difference detected by the detection unit. The information transmission apparatus includes a reflection layer and a vibration unit. The reflection layer is configured to reflect the radio wave. The vibration unit is configured to vibrate the reflection layer corresponding to the information, the information being transmitted by the information transmission apparatus.

According to this embodiment, since the doppler radar function is employed, it is not necessary for the transmission side to include a circuit dedicated to the millimeter wave other than the unit for reflecting and vibrating the millimeter-band radio wave. Information can be transmitted/received while utilizing the following characteristics of the millimeter-band radio wave. That is, the millimeter wave capable of passing through a soundproof wall and the like enables information communication therethrough, and the millimeter wave having a small wavelength enables communication excellent in directionality.

In this embodiment, preferably, the vibration unit is a speaker.

In this embodiment, preferably, the information transmission apparatus further includes a unit configured to map a signal into a predetermined vibration frequency corresponding to the information transmitted, configured to output the mapped signal to the speaker, and configured to mechanically vibrate the speaker at the predetermined vibration frequency.

According to another embodiment of the present invention, an information communication system includes an information transmission apparatus and an information reception apparatus. The information transmission apparatus includes a speaker, a reflection mechanism, and an emitting device. The reflection mechanism is provided on the speaker and is configured to reflect a millimeter-band radio wave and configured to be vibrated by the speaker corresponding to information transmitted. The emitting device is configured to emit the radio wave to the reflection mechanism. The information reception apparatus includes a reception unit and a demodulation unit. The reception unit is configured to receive the radio wave reflected by the reflection mechanism. The demodulation unit is configured to demodulate the information from the received radio wave.

According to this embodiment, the reflection mechanism on the speaker serves as a reflector. Information can be transmitted/received with an extremely simple configuration while utilizing the following characteristics of the millimeter-band radio wave. That is, the millimeter wave capable of passing through a soundproof wall and the like enables information communication therethrough, and the millimeter wave having a small wavelength enables communication excellent in directionality.

According to another embodiment of the present invention, an information reception apparatus includes a transmission/reception unit, a detection unit, and a reconstruction unit. The transmission/reception unit is configured to transmit/receive a millimeter-band radio wave. The detection unit is configured to detect a phase difference between the millimeter-band radio waves transmitted/received by the transmission/reception unit. The reconstruction unit is configured to reconstruct information based on the phase difference detected by the detection unit.

According to another embodiment of the present invention, an information transmission apparatus includes a reflection layer configured to reflect a millimeter-band radio wave, and a vibration unit configured to vibrate the reflection layer corresponding to information transmitted. For example, the vibration unit is a speaker.

According to another embodiment of the present invention, an information transmission apparatus includes a speaker, a reflection mechanism, and an emitting device. The reflection mechanism is provided on the speaker. The reflection mechanism is configured to reflect a millimeter-band radio wave, and configured to be vibrated by the speaker corresponding to information transmitted. The emitting device is configured to emit the millimeter-band radio wave to the reflection mechanism.

According to the embodiments of the present invention, there can be provided an information communication method, an information communication system, an information reception apparatus, and an information transmission apparatus, which eliminate the technical demerits of the millimeter band as much as possible, and employ a totally novel communication system utilizing the characteristics of the millimeter band.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the accompanying drawings.

Figure 1:
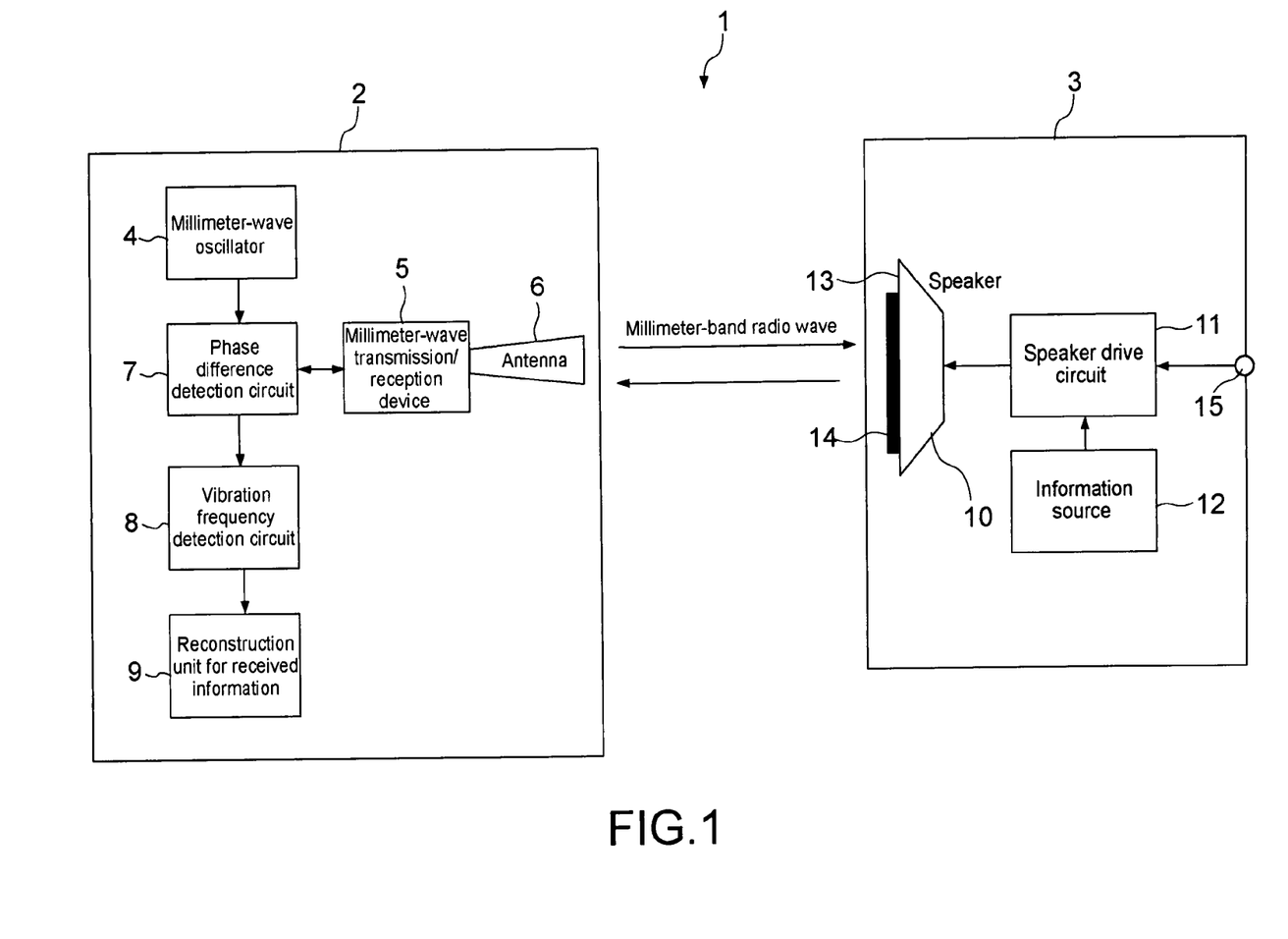
FIG. 1 is a block diagram showing a configuration of an information communication system according to an embodiment of the present invention.

FIG. 1 is a block diagram showing a configuration of an information communication system according to an embodiment of the present invention.

As shown in FIG. 1, the information communication system, denoted by reference numeral 1, includes an information reception apparatus 2 and an information transmission apparatus 3. The information reception apparatus 2 receives information through a millimeter-band radio wave. The information transmission apparatus 3 transmits the information to the information reception apparatus 2.

The information reception apparatus 2 includes a millimeter-wave oscillator 4, a millimeter-wave transmission/reception device 5, an antenna 6, a phase difference detection circuit 7, a vibration frequency detection circuit 8, and a reconstruction unit 9 for received information.

The millimeter-wave oscillator 4 oscillates a millimeter wave of 30 GHz to 300 GHz. The millimeter wave is transmitted via the phase difference detection circuit 7 to the millimeter-wave transmission/reception device 5.

The millimeter-wave transmission/reception device 5 amplifies the millimeter wave from the millimeter-wave oscillator 4, outputs the amplified millimeter wave to the antenna 6, and receives a millimeter wave via the antenna 6.

The antenna 6 transmits the millimeter wave from the millimeter-wave transmission/reception device 5.

The phase difference detection circuit 7 detects a phase difference between the millimeter wave (reference signal) oscillated from the millimeter wave oscillator 4 and a millimeter wave reflected by a reflection layer 14 of the information transmission apparatus 3 and then received by the millimeter wave transmission/reception device 5 via the antenna 6. The phase difference detection circuit 7 outputs a signal corresponding to the phase difference to the vibration frequency detection circuit 8.

The vibration frequency detection circuit 8 detects a vibration frequency of the reflection layer 14 based on the signal output from the phase difference detection circuit 7, that is, based on the doppler radar function. The vibration frequency detection circuit 8 outputs a signal corresponding to the detected vibration frequency to the reconstruction unit 9.

The reconstruction unit 9 for received information reconstructs, based on the signal output from the vibration frequency detection circuit 8, information having been mapped.

The information transmission apparatus 3 includes a speaker 10, a speaker drive circuit 11, and an information source 12.

The speaker 10 includes a vibration plate 13 and the reflection layer 14 provided on the vibration plate 13.

The vibration plate 13 vibrates in response to a drive signal from the speaker drive circuit 11. The speaker 10 outputs sound.

The reflection plate 14 provided on the vibration plate 13 reflects the millimeter-band radio wave transmitted from the information reception apparatus 2. The reflection plate 14 has a predetermined shape such that the reflection plate 14 is capable of adjusting a reflection direction of the millimeter-band radio wave.

The speaker drive circuit 11 amplifies a signal from the information source 12 and vibrates the vibration plate 13 of the speaker 10. Further, an audible signal is input via an input terminal 15 to the speaker drive circuit 11. The speaker drive circuit 11 amplifies the audible signal, to thereby vibrate the vibration plate 13 of the speaker 10. The audible sound is thus output from the speaker 10.

The information source 12 outputs information. The information may be mapped by the information source 12 or may be mapped by the speaker drive circuit 11.

The following is an example of mapping. In a case of transmitting information of "0", the vibration frequency is variable from f 0 Hz to f 1 Hz. In a case of transmitting information of "1", the vibration frequency is variable from f 1 Hz to f 0 Hz. The way of mapping is not limited to the above, but other various modifications can occur.

Figure 2:
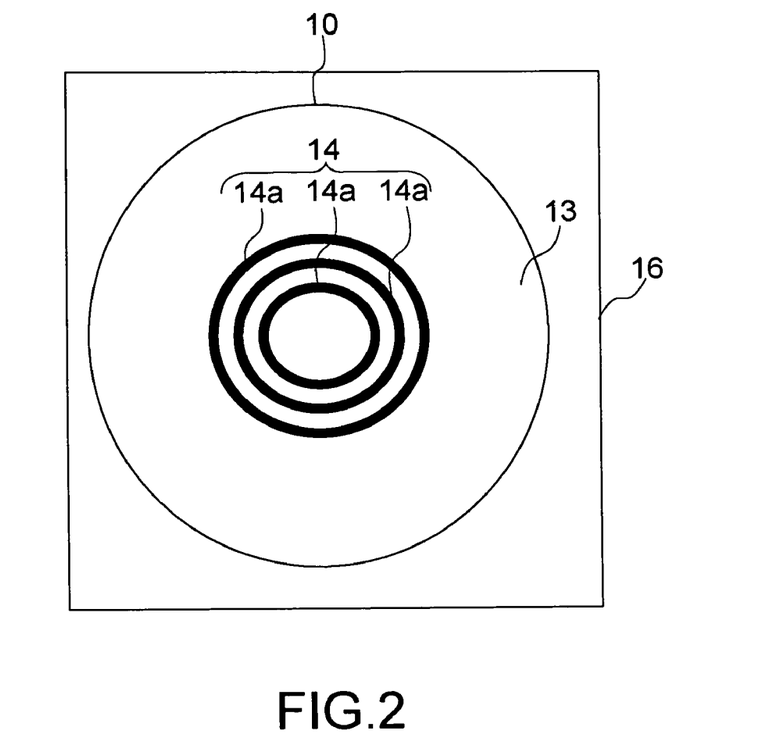
FIG. 2 is a plan view of a speaker including a reflection layer shown in FIG. 1.
Figure 3:
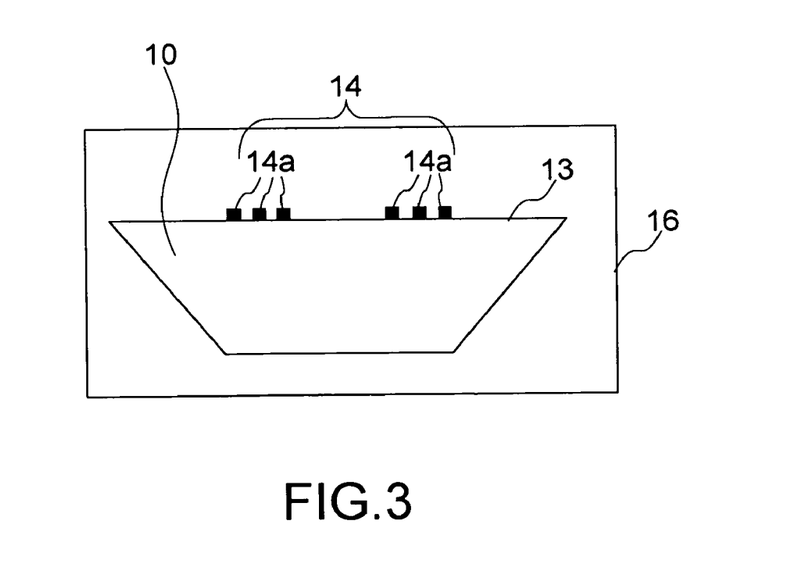
FIG. 3 is a side view of the speaker including the reflection layer shown in FIG. 1.

FIG. 2 is a plan view of the speaker 10 shown in FIG. 1. FIG. 3 is a side view of the speaker 10 shown in FIG. 1.

As shown in FIGS. 2 and 3, the speaker 10 is accommodated in a casing 16. The reflection layer 14 includes a plurality of annular reflection members 14a cocentrically provided on the vibration plate 13. The number, shapes, and the like of the reflection members 14a are not limited to this example.

Subsequently, how the information reception apparatus 2 and the information transmission apparatus 3 receives/transmits information will be described.

In the information reception apparatus 2, the millimeter-wave oscillator 4 oscillates a millimeter wave. The millimeter wave is input via the phase difference detection circuit 7 to the millimeter-wave transmission/reception device 5. The millimeter-wave transmission/reception device 5 amplifies the millimeter wave, which is then transmitted from the antenna 6 as a millimeter-band radio wave.

In the information transmission apparatus 3, the information source 12 outputs information. A signal corresponding to the information is output via the speaker drive circuit 11 to the speaker 10. As a result, the vibration plate 13 and the reflection plate 14 vibrate at a vibration frequency corresponding to the information from the information source 12.

The millimeter-band radio wave transmitted from the information reception apparatus 2 is reflected by the reflection layer 14 while vibrating at the above vibration frequency.

In the information reception apparatus 2, the millimeter-wave transmission/reception device 5 receives, via the antenna 6, the millimeter-band radio wave reflected by the reflection layer 14.

The phase difference detection circuit 7 detects the phase difference between the millimeter-band radio wave (reference signal) oscillated from the millimeter-wave oscillator 4 and the received millimeter-band radio wave. The phase difference detection circuit 7 outputs, to the vibration frequency detection circuit 8, a signal corresponding to the phase difference.

The vibration frequency detection circuit 8 detects the vibration frequency of the reflection layer 14 based on the phase difference detected by the phase difference detection circuit 7.

Then, the reconstruction unit 9 for received information reconstructs the information from the information source 12 based on the vibration frequency detected by the vibration frequency detection circuit 8. For example, in the case where the vibration frequency is variable from f 0 Hz to f 1 Hz, the information of "0" is reconstructed. In the case where the vibration frequency is variable from f 1 Hz to f 0 Hz, the information of "1" is reconstructed.

According to this embodiment, the information transmission apparatus 3 being an information transmission side includes no oscillator or modulator. Alternatively, by only providing a vibration mechanism to the speaker 10, information transmission is enabled. The configuration is thus extremely simplified. Specifically, from a technical point of view, it is generally more difficult to configure a device employing a millimeter-band radio wave than a device employing a SHF radio wave (3 GHz to 30 GHz) or lower. However, the millimeter-band radio wave has the following characteristics. That is, the millimeter-band radio wave can be transmitted while passing through a soundproof wall and the like, which enables information communication therethrough. Further, since the millimeter wave has a small wavelength, communication with excellent directionality is enabled. Information communication taking advantage of the above characteristics is enabled while eliminating the above difficulty as much as possible. It should be noted that, in this embodiment, it is not necessary to provide a transmission line for power supply to the reflection layer 14. Therefore, there is no fear of losing a millimeter-band signal in a transmission line. In addition, there is no fear of degrading reliability of information transmission/reception due to vibration of a transmission line.

Further, to secure sound quality, the speaker 10 is in most cases located at a position where a user can view the speaker 10. Alternatively, the speaker 10 is at least located closer to an outside of the information transmission apparatus 3. Thus, it is preferable for the reflection layer 14 that reflects the millimeter wave to be provided on the speaker 10. Since the reflection plate 14 is provided on the vibration plate 13, the information communication system can be configured without additionally securing a position where the reflection plate 14 is located.

It should be noted that, when transmitting/receiving information using the millimeter-band radio wave, by locating the information reception apparatus 2 closer to the information transmission apparatus 3 (contactlessly), information transmission/reception reliability can be improved.

Subsequently, another embodiment of the present invention will be described.

Figure 4:
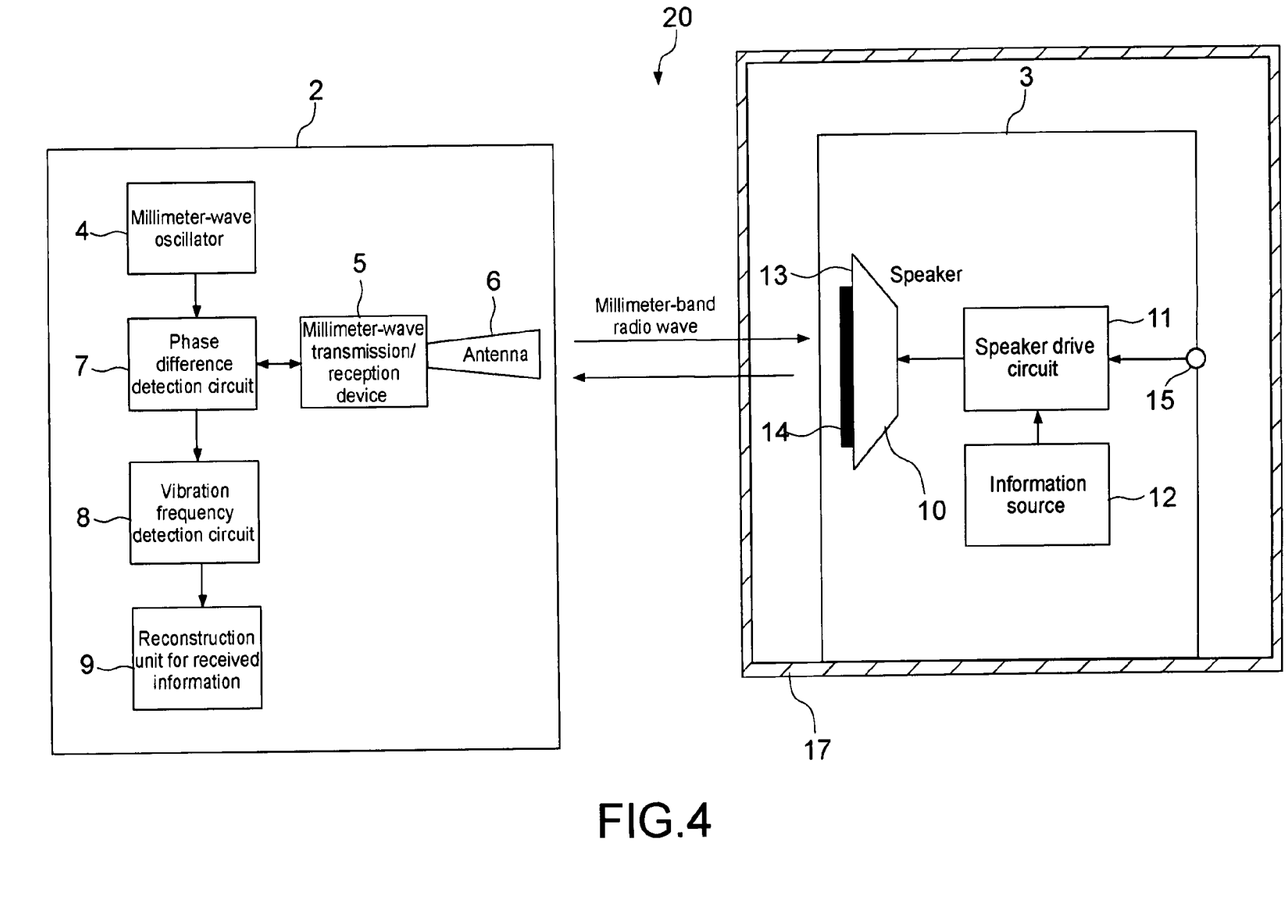
FIG. 4 is a block diagram showing a configuration of an information communication system according to another embodiment of the present invention, in which the information transmission apparatus is located in a soundproof chamber.

FIG. 4 is a block diagram showing a configuration of an information communication system in a case where the information transmission apparatus 3 is located in a soundproof chamber.

As shown in FIG. 4, in the information communication system, denoted by reference numeral 20, the information transmission apparatus 3 is located in the soundproof chamber, denoted by reference numeral 17. The soundproof chamber 17 allows the millimeter-band radio wave from the information reception apparatus 2 and the millimeter-band radio wave for transmitting information, reflected by the reflection layer 14, to pass therethrough. Therefore, sound from the speaker 10 cannot be heard outside of the soundproof chamber 17, while enabling information transmission/reception, since the millimeter-band radio wave for transmitting information and the like pass through a wall of the soundproof chamber 17. Herein, when the information corresponds to audible sound output from the speaker 10, it is possible to practically allow the audible sound to pass through the soundproof chamber 17.

It should be noted that, in a case where not only the information transmission apparatus 3 but also the information reception apparatus 2 is located in a not-shown soundproof chamber, or in a case where only the information reception apparatus 2 is located in the not-shown soundproof chamber, information can be similarly transmitted and received.

Figure 5:
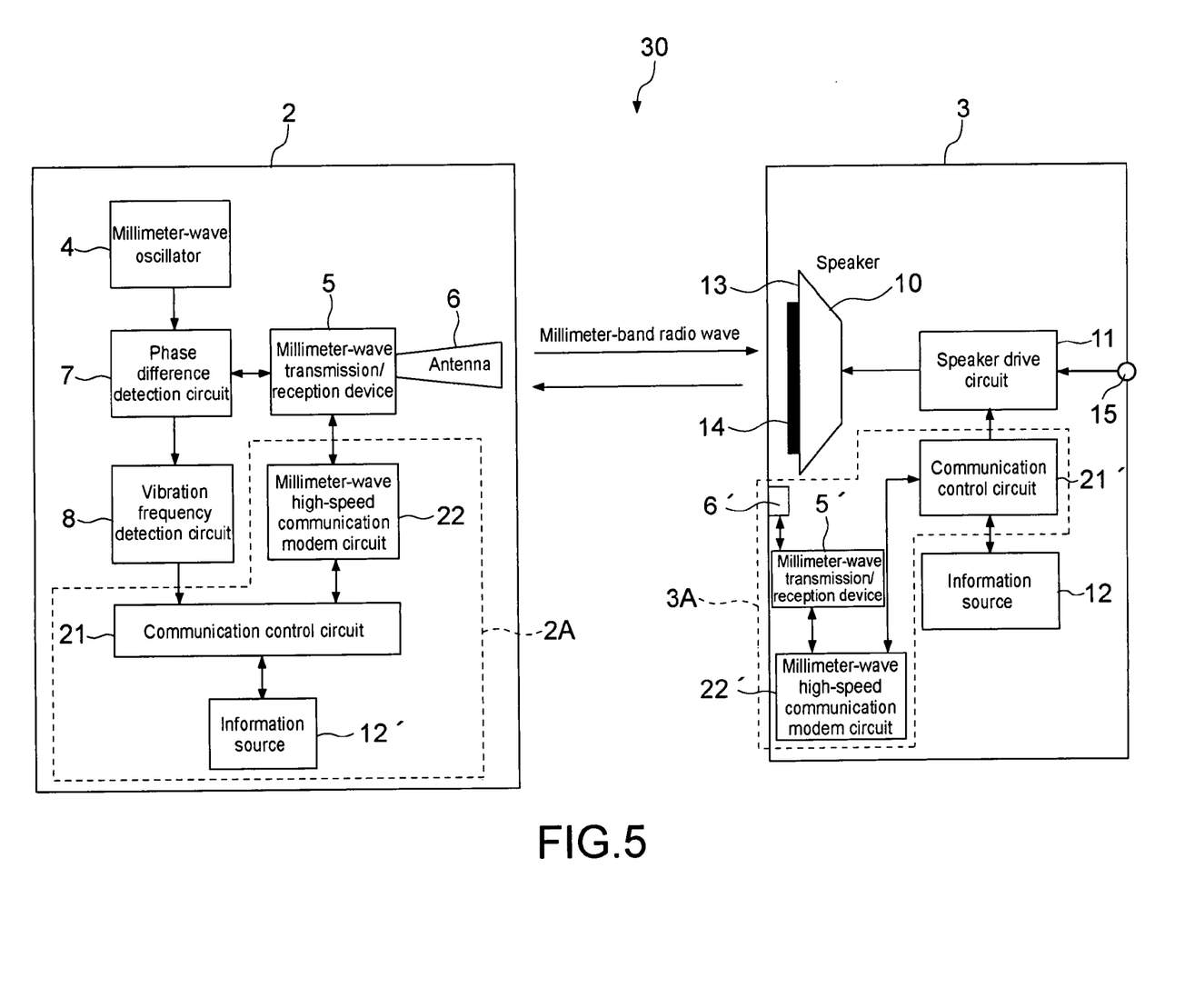
FIG. 5 is a block diagram showing a configuration of an information communication system according to another embodiment of the present invention, in which the information reception apparatus and the information transmission apparatus each includes a millimeter-wave transmission/reception function.

FIG. 5 is a block diagram showing a configuration of an information communication system according to another embodiment of the present invention. The information communication system, denoted by reference numeral 30, includes the information reception apparatus 2 and the information transmission apparatus 3 each including a millimeter-wave transmission/reception function (millimeter-wave high-speed communication function) different from that of the above embodiments.

The information reception apparatus 2 of this embodiment is similar to the information reception apparatus 2 shown in FIG. 1 except for further including an information source 12', a communication control circuit 21, and a millimeter-wave high-speed communication modem circuit 22, which are surrounded by a dotted line 2A.

The information source 12' contains information to be transmitted/received by the information communication system 30, for example.

The communication control circuit 21 outputs a signal to the millimeter-wave high-speed communication modem circuit 22 in response to a signal from the information source 12', and outputs a signal from the millimeter-wave high-speed communication modem circuit 22 to the information source 12'.

The millimeter-wave high-speed communication modem circuit 22 modulates the signal from the communication control circuit 21 to output the signal to the millimeter-wave transmission/reception device 5, and demodulates a signal from the millimeter-wave transmission/reception device 5 to output the signal to the communication control circuit 21.

The information transmission apparatus 3 of this embodiment is similar to the information transmission apparatus 3 shown in FIG. 1 except for further including a millimeter-wave transmission/reception device 5', an antenna 6', a communication control circuit 21', and a millimeter-wave high-speed communication modem circuit 22', which are surrounded by a dotted line 3A.

The millimeter-wave transmission/reception device 5', the antenna 6', the communication control circuit 21', and the millimeter-wave high-speed communication modem circuit 22' of the information transmission apparatus 3 operate similarly to the millimeter-wave transmission/reception device 5, the antenna 6, the communication control circuit 21, and the millimeter-wave high-speed communication modem circuit 22 of the information reception apparatus 2, respectively.

Subsequently, an operation in a case where the information reception apparatus 2 and the information transmission apparatus 3 transmit/receive security information and communication information (substantial information) will be described.

The information source 12 of the information transmission apparatus 3 outputs security information to the communication control circuit 21', for example.

The security information is transmitted from the information transmission apparatus 3 to the information reception apparatus 2 via the speaker 13 and the antenna 6. In a case where the security information has a satisfactory security condition, the information reception apparatus 2 allows information transmission/reception between the information transmission apparatus 3 and the information reception apparatus 2.

When the information transmission/reception between the information transmission apparatus 3 and the information reception apparatus 2 is allowed, transmission/reception of communication information between the information transmission apparatus 3 and the information reception apparatus 2 via the antennas 6 and 6' is enabled.

Figure 6:
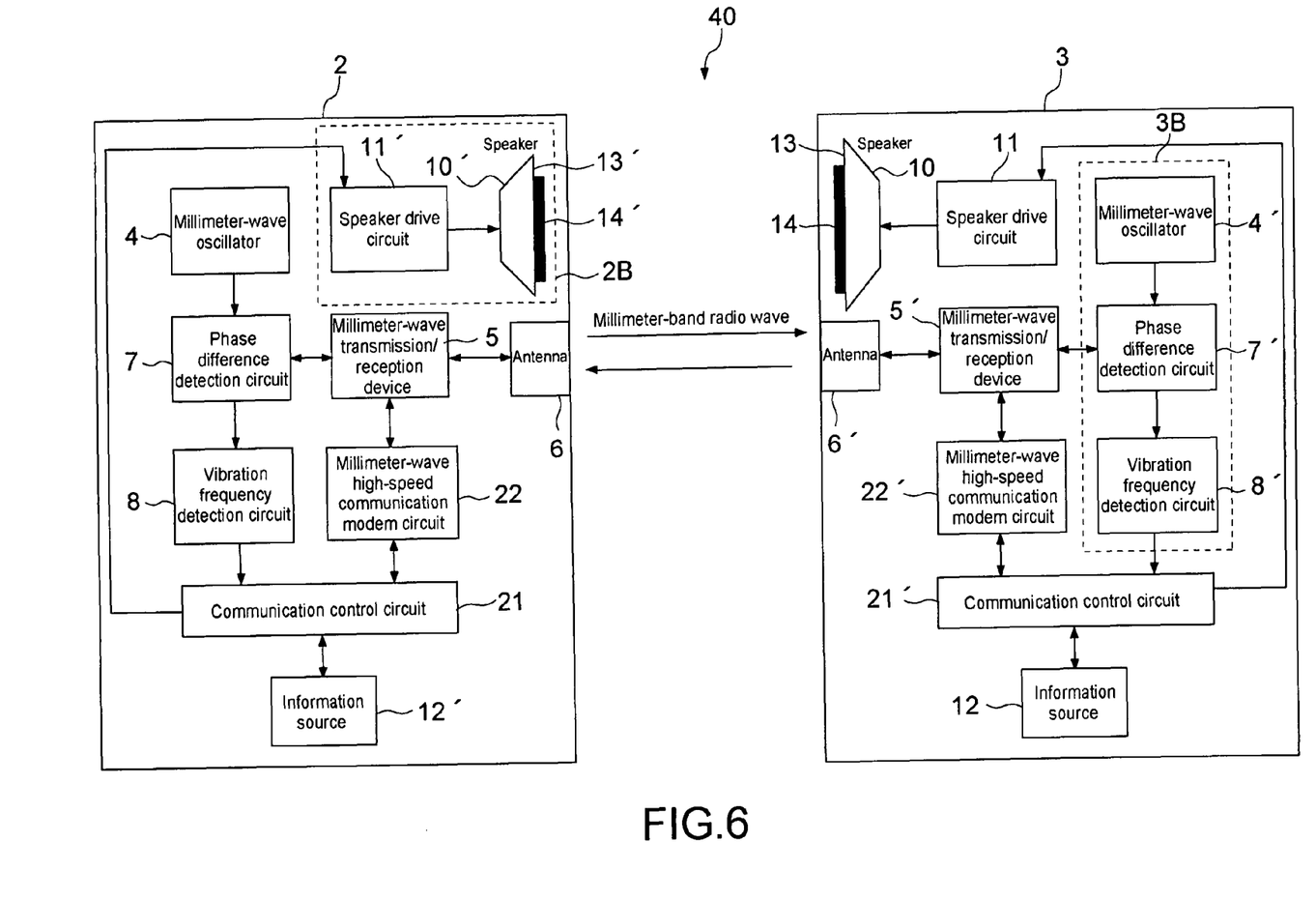
FIG. 6 is a block diagram showing a configuration of an information communication system according to another embodiment of the present invention, in which the information reception apparatus and the information transmission apparatus each includes the reflection layer and the millimeter-wave high-speed communication function.

FIG. 6 is a block diagram showing a configuration of an information communication system according to another embodiment of the present invention. The information communication system, denoted by reference numeral 40, includes the information reception apparatus 2 and the information transmission apparatus 3 each including the communication function employing the vibration mechanism provided with the reflection layer 14/a reflection layer 14', and the millimeter-wave high-speed communication function.

The information reception apparatus 2 of FIG. 6 is similar to the information reception apparatus 2 of FIG. 5 except for further including a speaker drive circuit 11' and a speaker 10' including the reflection layer 14', which are surrounded by a dotted line 2B.

The speaker drive circuit 11' and the speaker 10' including the reflection layer 14' of FIG. 6 operate similar to the speaker drive circuit 11 and the speaker 10 including the reflection layer 14 according to the above embodiments, respectively.

The information transmission apparatus 3 of FIG. 6 is similar to the information transmission apparatus 3 of FIG. 5 except for further including a millimeter-wave oscillator 4', a phase difference detection circuit 7', and a vibration frequency detection circuit 8', which are surrounded by a dotted line 3B.

The millimeter-wave oscillator 4', the phase difference detection circuit 7', and the vibration frequency detection circuit 8' of FIG. 6 operate similar to the millimeter-wave oscillator 4, the phase difference detection circuit 7, and the vibration frequency detection circuit 8 according to the above embodiments, respectively.

With this configuration, bidirectional transmission/reception of security information can be enabled via the speakers 10 and 10'. Further, bidirectional transmission/reception of communication information (substantial information) can be enabled via the antennas 6 and 6'.

Figure 7:
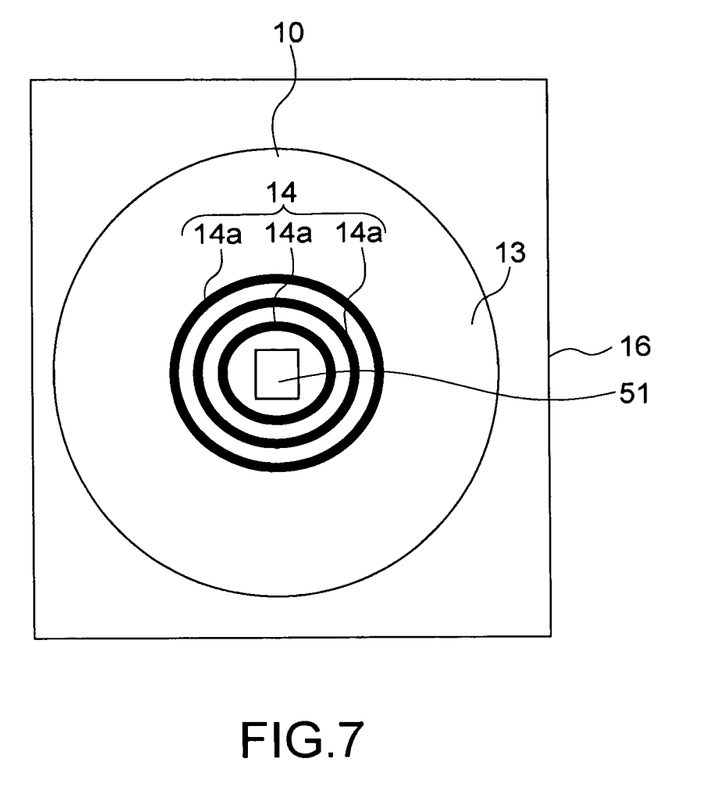
FIG. 7 is a plan view showing a speaker according to another embodiment of the present invention, in which a casing which supports the speaker is provided with an emitting device.
Figure 8:
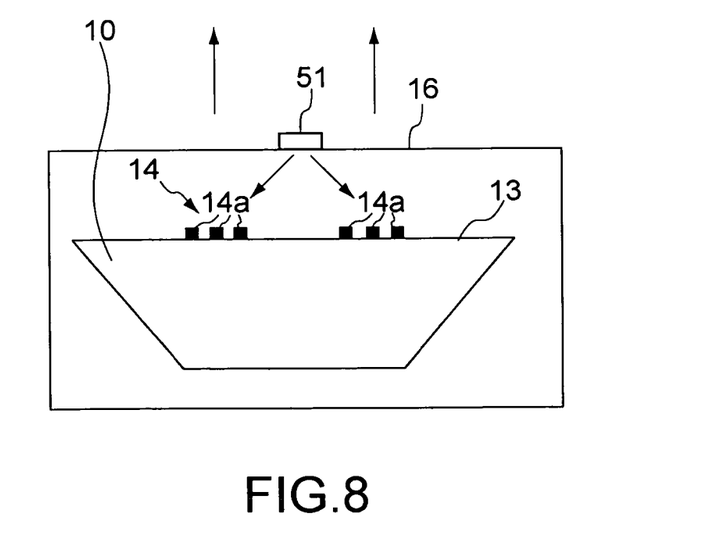
FIG. 8 is a side view of the speaker shown in FIG. 7.

FIG. 7 is a plan view showing a speaker according to another embodiment of the present invention. The casing 16 accommodating therein the speaker 10 is provided with an emitting device. FIG. 8 is a side view of the speaker 10 of FIG. 7.

As shown in FIGS. 7 and 8, to the information transmission apparatus 3, the speaker 10 including the vibration plate 13 and the reflection layer 14, the casing 16 accommodating therein the speaker 10, an emitting device 51 provided to the casing 16 so as to be opposed to the reflection layer 14, are provided.

The casing 16 supports the emitting device 51. The emitting device 51 emits a millimeter-band radio wave to the reflection layer 14. The emitting device 51 is connected to a not-shown power-supply wiring which runs on the casing 16. It should be noted that the power-supply wiring does not run on the vibration plate 13 of the speaker 10. That is, the speaker 10 of FIGS. 7 and 8 has the same structure as the speaker 10 of FIG. 1.

When the emitting device 51 emits a millimeter-band radio wave, the emitted radio wave is reflected by the reflection layer 14. Herein, the reflection layer 14 vibrates together with the vibration plate 13 corresponding to the information from the information source 12. Therefore, the information transmission apparatus 3 can transmit a millimeter-band radio wave containing the information from the information source 12 to the information reception apparatus 2.

With this configuration, it is only necessary for the not-shown information reception apparatus side to include a reception unit and a demodulation unit. Herein, the reception unit is configured to receive the radio wave reflected by the reflection layer 14. Further, the demodulation unit is configured to demodulate the information from the radio wave having been received. In addition, the information reception apparatus side does not require the millimeter-wave oscillator, the phase difference detection circuit, and the like of FIG. 1.

Further, since the not-shown power-supply wiring for supplying power to the emitting device 51 runs on the casing 16, it is not necessary for the vibration plate 13 and the like to have the wiring running thereon. Also, since the emitting device 51 emits a millimeter-band radio wave to the reflection layer 14, and the reflection layer 14 can reflect the millimeter-band radio wave containing information, it is not necessary to provide a power-supply wiring for supplying power to the reflection layer 14, to the vibration plate 13, for example.

Further, a speaker substantially similar to a general one can be used as the speaker 10 without modifying the structure thereof. So a reflection structure can be provided on the speaker 10 without being restricted by the structure thereof.

It should be noted that FIG. 8 shows the case where the emitting device 51 is provided to the casing 16. However, the position of the emitting device 51 is not limited to the above. The emitting device 51 may be located to any position other than the vibration plate 13, where the emitting device 51 can emit a radio wave to the reflection layer 14.

The present invention is not limited to the embodiments described above. It should be understood by those skilled in the art that various modifications, combinations, sub-combinations and alterations may occur depending on design requirements and other factors insofar as they are within the scope of the appended claims or the equivalents thereof.

The present invention can be applied to an electronic device provided with a speaker, such as a television, a radio, and a personal computer. Alternatively, an electronic device without a speaker may be positively provided with the speaker according to each embodiment of the present invention, as a matter of course.

Further, in each embodiment described above, a configuration in which a speaker includes a reflection mechanism configured to reflect a millimeter-band radio wave, is described as an example. Alternatively, the present invention can be applied to any mechanism other than the speaker, which is configured to reflect a millimeter-band radio wave transmitted corresponding to information while vibrating the radio wave.

FIG. 4 shows an example in which the one information transmission apparatus 3 located in the soundproof chamber 17 and the information reception apparatus 2 located outside of the soundproof chamber 17 transmits and receives information. Alternatively, since a millimeter-band radio wave has an excellent directionality, a plurality of information transmission apparatuses 3 located in the soundproof chamber 17 and a plurality of information reception apparatuses 2 located outside of the soundproof chamber 17 can transmit and receive information, respectively.

What is claimed is:

1. An information communication method, comprising:
    transmitting a millimeter-band radio wave from a reception side;
    reflecting the transmitted radio wave at a transmission side while vibrating the transmitted radio wave corresponding to first information transmitted by the transmission side; and
    receiving the reflected radio wave at the reception side and reconstructing the first information based on a phase difference between the transmitted radio wave and the received radio wave.

2. The information communication method according to claim 1,
    wherein the transmission side vibrates a reflection mechanism for reflecting a millimeter-band radio wave using a speaker provided with the reflection mechanism, corresponding to the first information, to reflect the transmitted radio wave while vibrating the transmitted radio wave corresponding to the first information.

3. The information communication method according to claim 2,
    wherein the transmission side outputs a signal mapped into a predetermined vibration frequency corresponding to the first information, to the speaker, and mechanically vibrates the speaker at the predetermined vibration frequency.

4. The information communication method according to claim 2,
    wherein the first information transmitted by the transmission side at least includes audible information, the audible information enabling to reproduce audible sound output by the speaker.

5. The information communication method according to claim 1, further comprising:
    modulating second information into a millimeter-band radio wave and transmitting the radio wave from one of the transmission side and the reception side; and
    receiving the transmitted radio wave and demodulating the transmitted radio wave into the second information at another one of the transmission side and the reception side.

6. The information communication method according to claim 5,
    wherein the reception side receives the radio wave for the first information using a first antenna, and
    wherein the reception side transmits/receives the radio wave for the second information using the first antenna.

7. The information communication method according to claim 5,
    wherein the reception side receives the radio wave for the first information using a first antenna, and
    wherein the reception side transmits/receives the radio wave for the second information using a second antenna, the second antenna being different from the first antenna.

8. An information communication method, comprising:
    emitting the radio wave to a reflection mechanism for reflecting a millimeter-band radio wave, and vibrating the reflection mechanism using a speaker provided with the reflection mechanism and provided to a transmission side, corresponding to first information transmitted by the transmission side, to reflect the radio wave; and
    receiving the radio wave reflected by the reflection mechanism at a reception side and demodulating the first information.

9. An information communication system, comprising:
    an information reception apparatus including a transmission/reception unit, a detection unit, and a reconstruction unit, the transmission/reception unit being configured to transmit/receive a millimeter-band radio wave, the detection unit being configured to detect a phase difference between the radio waves transmitted/received by the transmission/reception unit, the reconstruction unit being configured to reconstruct information based on the phase difference detected by the detection unit; and
    an information transmission apparatus including a reflection layer and a vibration unit, the reflection layer being configured to reflect the radio wave, the vibration unit being configured to vibrate the reflection layer corresponding to the information, the information being transmitted by the information transmission apparatus.

10. The information communication system according to claim 9,
    wherein the vibration unit is a speaker.

11. The information communication system according to claim 10,
    wherein the information transmission apparatus further includes a unit configured to map a signal into a predetermined vibration frequency corresponding to the information transmitted, configured to output the mapped signal to the speaker, and configured to mechanically vibrate the speaker at the predetermined vibration frequency.

12. An information communication system, comprising:
    an information transmission apparatus including a speaker, a reflection mechanism, and an emitting device, the reflection mechanism being provided on the speaker and being configured to reflect a millimeter-band radio wave and configured to be vibrated by the speaker corresponding to information transmitted, the emitting device being configured to emit the radio wave to the reflection mechanism; and
    an information reception apparatus including a reception unit and a demodulation unit, the reception unit being configured to receive the radio wave reflected by the reflection mechanism, the demodulation unit being configured to demodulate the information from the received radio wave.

13. An information reception apparatus, comprising:
    a transmission/reception unit configured to transmit/receive a millimeter-band radio wave;
    a detection unit configured to detect a phase difference between the millimeter-band radio waves transmitted/received by the transmission/reception unit; and
    a reconstruction unit configured to reconstruct information based on the phase difference detected by the detection unit.

14. An information transmission apparatus, comprising:
a reflection layer configured to reflect a millimeter-band radio wave; and
a vibration unit configured to vibrate the reflection layer corresponding to information transmitted.

15. The information transmission apparatus according to claim 14,
wherein the vibration unit is a speaker, and
wherein the reflection layer is provided on the speaker such that it is vibrated with vibration of the speaker.

16. An information transmission apparatus, comprising:
a speaker;
a reflection mechanism provided on the speaker, the reflection mechanism being configured to reflect a millimeter-band radio wave, and configured to be vibrated by the speaker corresponding to information transmitted by the reflection mechanism; and
an emitting device configured to emit the millimeter-band radio wave to the reflection mechanism.

* * * * *